(12) United States Patent
Godil et al.

(10) Patent No.: US 9,807,285 B2
(45) Date of Patent: Oct. 31, 2017

(54) APPARATUS, METHOD AND TECHNIQUES FOR DISSIPATING THERMAL ENERGY

(71) Applicant: INTEL CORPORATION, Santa Clara, CA (US)

(72) Inventors: Amin Godil, Beaverton, OR (US); Shantanu D. Kulkarni, Hillsboro, OR (US); Ralph Miele, Dupont, WA (US); Andrew Larson, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/668,675

(22) Filed: Mar. 25, 2015

(65) Prior Publication Data
US 2016/0286099 A1    Sep. 29, 2016

(51) Int. Cl.
| | | |
|---|---|---|
| *H05K 7/20* | (2006.01) | |
| *H04N 5/225* | (2006.01) | |
| *B23P 15/26* | (2006.01) | |
| *G06F 1/20* | (2006.01) | |
| *H01L 23/473* | (2006.01) | |

(52) U.S. Cl.
CPC ............ *H04N 5/2252* (2013.01); *B23P 15/26* (2013.01); *G06F 1/20* (2013.01)

(58) Field of Classification Search
CPC . G06F 1/181–1/182; H05K 7/20218–7/20381; H05K 7/20409–7/20418; H05K 7/20009–7/202; H01L 23/367–23/3677; H01L 23/473; H01L 23/46–23/467
USPC ...... 361/676–678, 679.46–679.54, 688–723; 165/80.1–80.5, 104.33, 185; 174/15.1–15.3, 16.1–16.3, 547, 548; 257/712–722, E23.088; 24/453, 458–459; 454/184; 312/236

See application file for complete search history.

(56) References Cited

U.S. PATENT DOCUMENTS

| | | | | |
|---|---|---|---|---|
| 4,689,720 | A | 8/1987 | Daszkowski | |
| 5,381,304 | A * | 1/1995 | Theroux | H05K 7/1417 174/521 |
| 5,608,610 | A * | 3/1997 | Brzezinski | H01L 23/3675 257/713 |
| 6,181,558 | B1 * | 1/2001 | Gordon | H01L 23/4275 165/104.33 |
| 6,211,463 | B1 * | 4/2001 | Fabis | H01L 23/3732 174/548 |
| 6,898,072 | B2 * | 5/2005 | Beihoff | B60L 11/12 257/692 |

(Continued)

OTHER PUBLICATIONS

International Search Report received for PCT Patent Application No. PCT/US2016/024080, dated Jun. 13, 2016, 2 pages.

*Primary Examiner* — Anthony Haughton
*Assistant Examiner* — Razmeen Gafur

(57) ABSTRACT

Various embodiments are generally directed to an apparatus, method and other techniques to thermally couple a device comprising one or more cameras and circuitry with a housing to house the device, receive thermal energy generated by at least one of the one or more cameras and the circuitry. Further, embodiments may include transferring the thermal energy absorbed from a surface of the device to a surface of the housing and absorbing movement of the housing such that the movement of the housing does not cause substantial movement of the device.

24 Claims, 11 Drawing Sheets

(56) References Cited

U.S. PATENT DOCUMENTS

| | | | | |
|---|---|---|---|---|
| 7,903,408 B1* | 3/2011 | Yu | ................. | H05K 5/0278<br>174/16.1 |
| 2002/0172005 A1* | 11/2002 | Ford | ................. | G06F 1/203<br>361/679.53 |
| 2003/0133267 A1* | 7/2003 | Beihoff | ................. | B60L 11/12<br>361/704 |
| 2003/0189815 A1* | 10/2003 | Lee | ................. | H01L 23/427<br>361/719 |
| 2005/0225947 A1* | 10/2005 | Araujo | ................. | H05K 5/0008<br>361/719 |
| 2006/0087015 A1 | 4/2006 | Yuan et al. | | |
| 2007/0030657 A1* | 2/2007 | Hanai | ................. | H05K 7/20236<br>361/721 |
| 2007/0297131 A1* | 12/2007 | Hood | ................. | H01L 23/4093<br>361/679.54 |
| 2008/0144290 A1* | 6/2008 | Brandt | ................. | B60R 16/0239<br>361/720 |
| 2008/0253090 A1* | 10/2008 | Janisch | ................. | H01L 23/3677<br>361/709 |
| 2011/0075365 A1* | 3/2011 | Tomioka | ................. | H05K 7/20136<br>361/697 |
| 2011/0141691 A1* | 6/2011 | Slaton | ................. | H05K 7/20145<br>361/690 |
| 2011/0211314 A1* | 9/2011 | Hong-Chi | ................. | H01R 12/716<br>361/718 |
| 2011/0242767 A1* | 10/2011 | Okamoto | ................. | H01P 1/218<br>361/714 |
| 2012/0125682 A1* | 5/2012 | Lu | ................. | H05K 7/20454<br>174/548 |
| 2012/0281364 A1* | 11/2012 | Gunderson | ................. | H05K 5/0256<br>361/714 |
| 2013/0016477 A1* | 1/2013 | Yokoya | ................. | H01L 23/36<br>361/719 |
| 2013/0044436 A1* | 2/2013 | Kovatchev | ................. | H05K 1/0218<br>361/720 |
| 2013/0050954 A1* | 2/2013 | Albrecht, III | ................. | H05K 1/0203<br>361/720 |
| 2013/0265722 A1* | 10/2013 | Hill | ................. | G06F 1/203<br>361/707 |
| 2013/0294032 A1* | 11/2013 | Stella | ................. | H01L 23/367<br>361/718 |

* cited by examiner

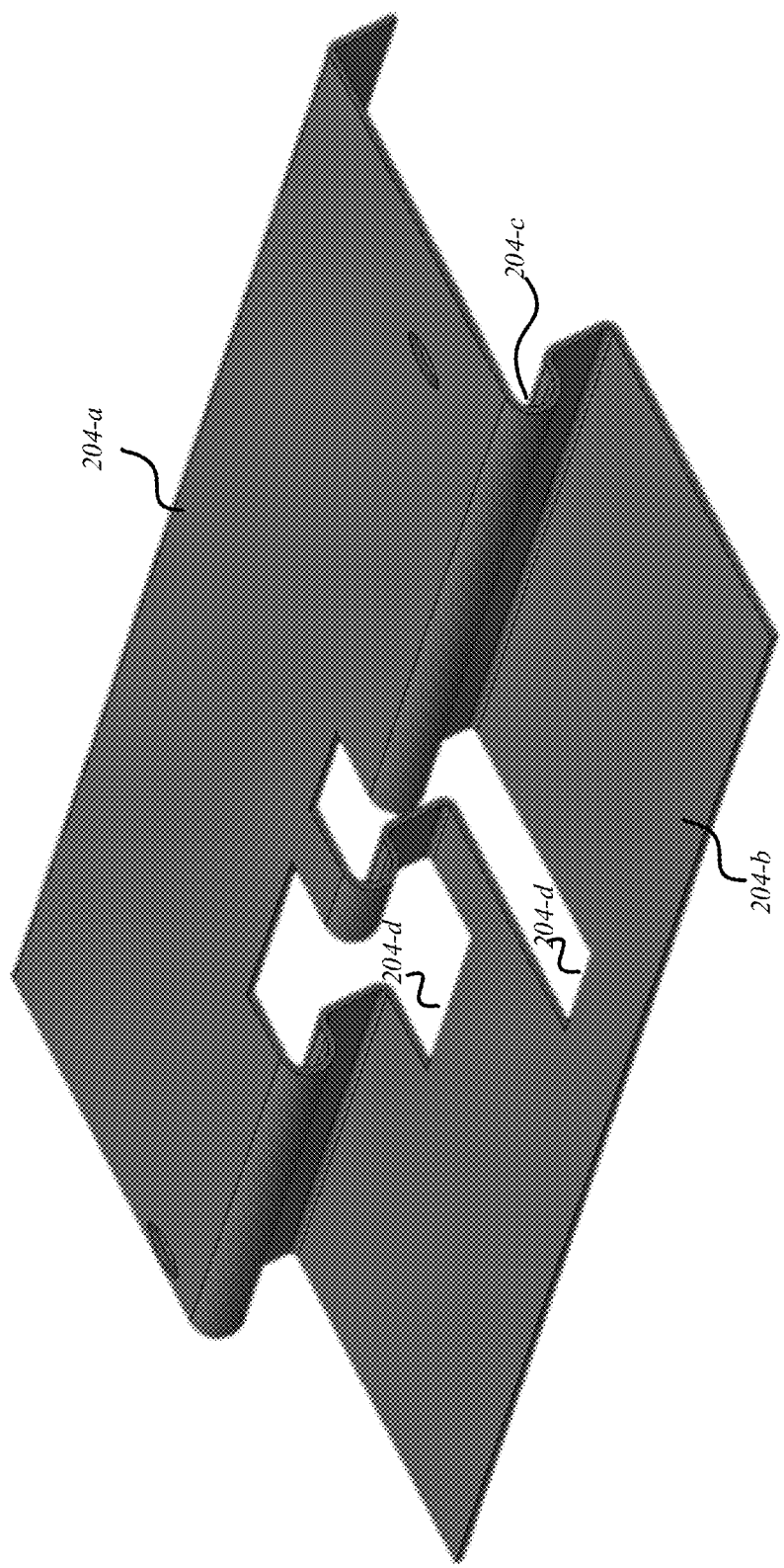

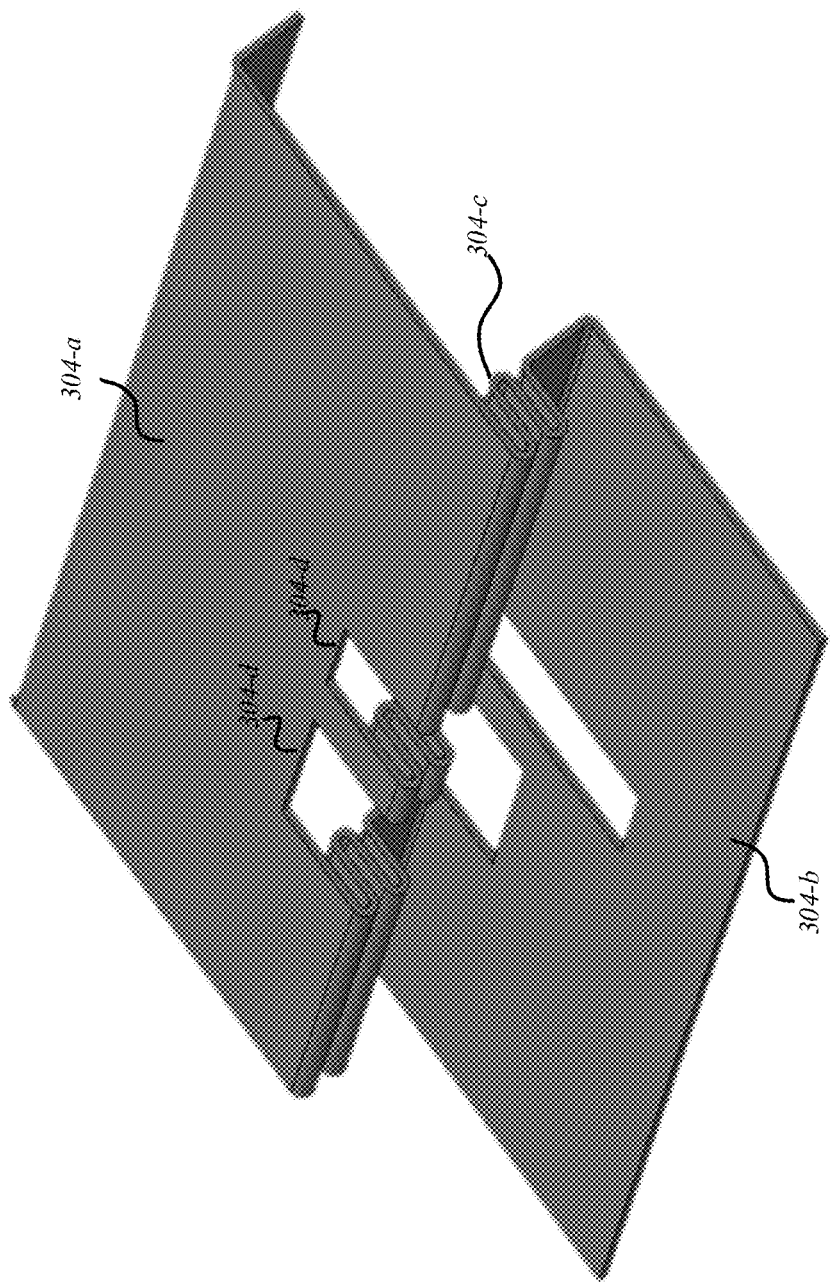

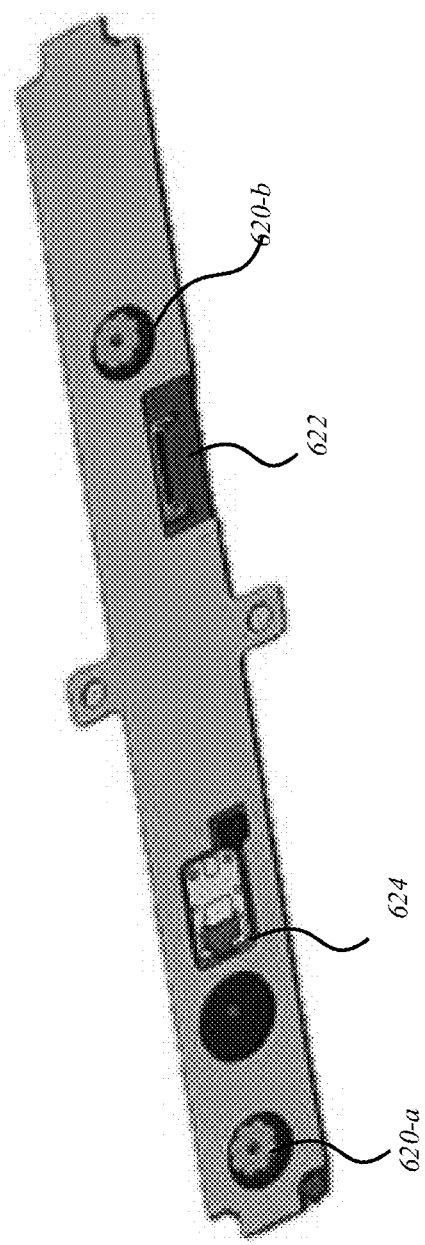

700

- THERMALLY COUPLING A DEVICE COMPRISING ONE OR MORE CAMERAS AND CIRCUITRY WITH A HOUSING TO HOUSE THE DEVICE

705

- RECEIVING THERMAL ENERGY GENERATED BY AT LEAST ONE OF THE ONE OR MORE CAMERAS AND THE CIRCUITRY

710

- TRANSFERRING THE THERMAL ENERGY ABSORBED FROM A SURFACE OF THE DEVICE TO A SURFACE OF THE HOUSING

715

- ABSORBING MOVEMENT OF THE HOUSING SUCH THAT THE MOVEMENT OF THE HOUSING DOES NOT CAUSE SUBSTANTIAL MOVEMENT OF THE DEVICE

APPARATUS, METHOD AND TECHNIQUES FOR DISSIPATING THERMAL ENERGY

TECHNICAL FIELD

Embodiments described herein generally relate techniques to dissipate thermal energy from a device.

BACKGROUND

In recent years, computing technology has continued to advance at an increasingly more rapid pace. For example, microprocessors operating speeds have increased and are expected to increase in the future. As a result, increasing amount of heat has to be removed from devices having these advanced microprocessors, leading to the employment of heat sinks with ever increasing form factors.

BRIEF DESCRIPTION OF THE DRAWINGS

FIG. 2A illustrates an example embodiment of a flexible heat conductor.

FIG. 3A illustrates a second example embodiment of a flexible heat conductor.

FIG. 6 illustrates an example embodiment of a device.

FIG. 7 illustrates an example embodiment of a logic flow.

DETAILED DESCRIPTION

Figure 1:
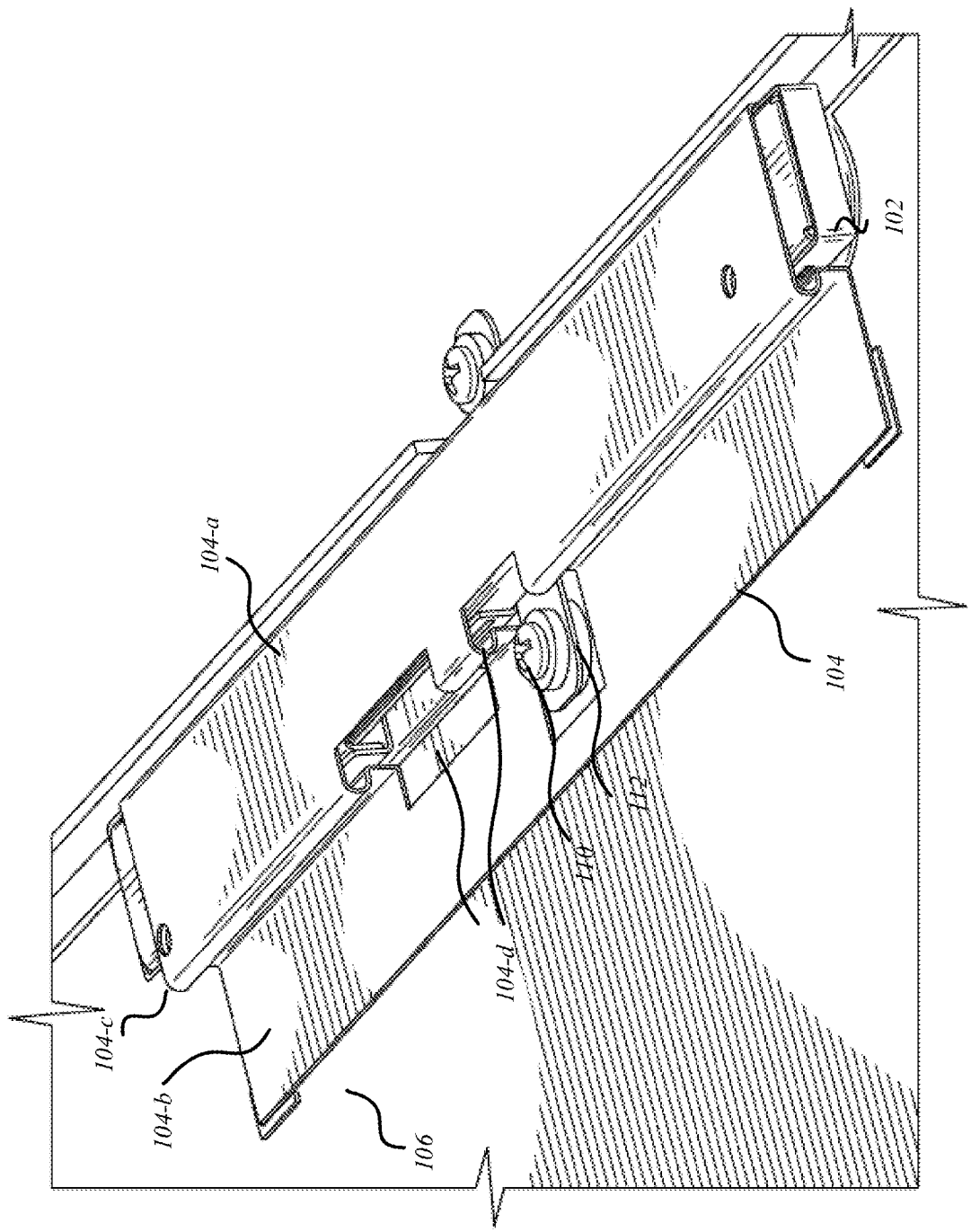
FIG. 1 illustrates an example embodiment of a thermal conductive assembly.

Various embodiments may include an apparatus, system and techniques to thermally couple a device with an environment and/or surface such that thermal energy generated by the device is dissipated into the environment and/or surface. For example, embodiments may include a flexible heat conductor coupled with one or more surfaces of the device and one or more surfaces of a housing, the flexible heat conductor may absorb thermal energy generated by the device and dissipate the thermal energy into the surface of the housing.

In some embodiments, the flexible heat conductor may also include a relief strain portion to allow for movement of the surface of the housing and the housing itself without causing movement of the device. For example, the relief strain portion may include one or more relief loops to absorb the movement of the housing without transferring the movement to the device. These and other features will be described in more detail in the following description.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an exemplary embodiment of a thermal conductive assembly 100 in which aspects of the present disclosure may be employed. The thermal conductive assembly 100 may include any number of devices, components and so forth to dissipate thermal energy from a computing device. Thermal conductive assembly 100 may include a computing device 102, a flexible heat conductor 104 and a housing 106. In various embodiments, the flexible heat conductor 104 may be coupled with the computing device 102 and the housing 106 such that thermal energy generated by the computing device 102 is absorbed and transferred to the housing 106 for dissipation to an outside environment. Further and as will be discussed in more detail below, the flexible heat conductor 104 may include one or more features to allow for movement of the housing 106 without substantially moving the computing device 102. A substantial movement of the computing device 102 may be considered any movement that effects the operation of the computing device 102 in a negative manner, for example. These and other details will become more apparent in the following description.

In various embodiment, computing device 102 may be any device capable of processing information and data. The computing device 102 may include any number of components and circuitry, including processing components, memory components, communication components, I/O components, camera components, and so forth. The computing device 102 may include any type of computing device, such as a personal digital assistant, a mobile computing device, a smart phone, a cellular telephone, a handset, a one-way pager, a two-way pager, a messaging device, a computer, a laptop computer, a notebook computer, a handheld computer, a tablet computer, a network appliance, a web appliance, multiprocessor systems, processor-based systems, or any combination thereof. The embodiments are not limited in this context. For example, the computing device 102 may be a camera device or a 3-dimensional (3-D) camera device, such as any camera including Intel's® RealSense® technology. In another example, computing device 102 may be a computing or processing component such as a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit.

The computing device 102 may generate thermal energy, e.g. heat, which, in some instances, may be harmful to the computing device 102 and/or components of the device. Thus, embodiments may be directed to various techniques to dissipate the thermal energy to surrounding areas. More specifically, embodiments may include a flexible heat conductor 104 capable of absorbing thermal energy and dissipating the thermal energy to an outside environment or object. For example, the flexible heat conductor 104 may include a first portion 104-a coupled with a surface or a portion of the computing device 102, and a second portion 104-b of the flexible heat conductor 104 maybe coupled with a surface or a portion of the housing 106. In this example, thermal energy may be absorbed from the computing device 102 by the flexible heat conductor 104 and dissipated into the surface of the housing 106. In another example, the flexible heat conductor 104 may include "fins" (not shown) which may dissipate thermal energy absorbed by the first portion 104-a to an outside environment. Various embodiments are not limited in this manner and other arrangements may be contemplated.

The flexible heat conductor 104 may take any form or shape such that it adequately removes thermal energy from computing device 102, e.g. it removes thermal energy at a rate fast enough to prevent harm to the device. In some embodiments, the flexible heat conductor 104 may have the first portion 104-a to substantially cover, contact, and/or couple with a surface of the computing device 102 to absorb thermal energy, for example. More specifically, the first portion 104-a may cover 95% or more of a surface of the computing device 102. In another example, the flexible heat conductor 104 may have a first portion 104-a that covers 85%-95% of a surface of the computing device 102. The amount or area the first portion 104-a that covers and/or contacts a surface of a device can be dependent on a rate of dissipation required to remove thermal energy. Various embodiments are not limited in this manner.

The flexible heat conductor 104 includes the second portion 104-b to couple with and/or contact another object such as a surface of the housing 106 to dissipate thermal energy. The amount or area the second portion 104-b covers and/or contacts a surface of the housing 106 may also be dependent on a rate of dissipation required to remove thermal energy. In another example and as previously mentioned, the flexible heat conductor 104 may have the second portion 104-b that includes "fins" which may dissipate thermal energy to an outside environment, e.g. air. Various embodiments are not limited in this manner.

The flexible heat conductor 104 may have a relief strain portion 104-c that couples the first portion 104-a and the second portion 104-b. The relief strain portion 104-c may include a number of features and may allow for movement of the housing 106 (and second portion 104-b) without substantially moving the computing device 102 (and the first portion 104-a). In another words, the relief strain portion 104-c of the flexible heat conductor 104 may allow the housing 106 and the second portion 104-b coupled with the housing 106 to move, bend, deform and so forth, without causing the first portion 104-a coupled with the computing device 102 to move or substantially move. In one example, the computing device 102 may be a camera device which may include two infrared cameras separated on a module to provide 3-D camera capabilities. In this example, a substantial movement of the computing device 102 may include any movement that causes relative displacement between the two cameras of greater than ten micrometers. A movement of this magnitude or greater would introduce errors into depth calculations which are critical to depth perception accuracy of the 3-D camera. Thus, the relief strain portion may be operable to limit movement of the first portion 104-a of the flexible heat conductor 104 coupled with the computing device 102 to less than ten micrometers. For example and as will be discussed in more detail below, the relief strain portion may include one or more relief strain loops to absorb the movement of the housing 106 and the portion of the flexible heat conductor 104 coupled with the housing 106. Various embodiments are not limited to the above-recited example and the relief strain portion may include features and be designed in a different manner to meet different movement requirements.

In some embodiments, the flexible heat conductor 104 may include one or more apertures 104-d or throughways to allow for cables, connectors, wires, and so forth to pass through the flexible heat conductor 104 to connect with the computing device 102. In some embodiments, the apertures 104-d may made or through one or more the portions of the flexible heat conductor 104, including the first portion 104-a, the second portion 104-b, and/or the relief strain portion 104-c to allow the connectors and/or fasteners access to the computing device 102 and/or housing 106.

The apertures 104-d may also allow one or more fastening devices 110 to secure the computing device 102 to the housing 106. For example, an aperture 104-d may provide a throughway from a screw to go through to attach the computing device 102 to the housing. Various embodiments may including any number of apertures 104-d to provide throughways for fastening devices 110. Moreover, and in some embodiments, shock absorbing standoffs 112 may be may be used with the fastening devices 110 to absorb movement of the housing 106. The shock absorbing standoffs 112 may absorb movement of the housing 106 such that the movement is not transferred to the computing device 102. The shock absorbing standoffs 112 may be made of any material to absorb shock, such as rubber.

The flexible heat conductor 104 may be made of any material that is capable of absorbing thermal energy. For example and in some embodiments, the flexible heat conductor 104 may be made of copper, aluminum, diamond, copper-tungsten, silicon carbide, beryllium oxide, or combination thereof. In addition, the flexible heat conductor 104 may be coupled with or secured to the computing device 102 and/or the housing 104 in any number of different ways such as using a thermal adhesive, a thermal conductive tape, an epoxy, a securing fastener, a screw, and so forth. In some embodiments, the flexible heat conductor 104 may use a thermal interface material to increase thermal coupling with the computing device 102 and/or the housing 106. The thermal interface material can include thermal grease, epoxy, phase change materials, polyimide, graphite tape, aluminum tape silicone-coated fabrics, and so forth. Various embodiments are not limited in this manner.

As mentioned, the thermal conductive assembly 100 may include a housing 106 to house various components including the computing device 102 and the flexible heat conductor 104. The housing 106 may include one or more sides to enclose the components and examples of the housing 106 may include a computer housing, a computer chassis, a tablet housing, a mobile device housing, a personal digital assistant housing, electronic housing, a camera housing, and so forth. The housing 106 may be made of any material including any type of plastic material, metal material, or combination thereof. In some embodiments, the material chosen for the housing 106 may be based on thermal conductivity characteristics. For example, the material may be chosen to absorb thermal energy from the flexible heat conductor 104 at a rate sufficient to prevent harm to the computing device 102.

FIGS. 2A/2B illustrate an example embodiment of a flexible heat conductor 204. The flexible heat conductor 204 may be similar to the flexible heat conductor 104 discussed above with respect FIG. 1. For example, flexible heat conductor 204 may include a first portion 204-a that is capable of being coupled with a device and a second portion 204-b that is capable of being coupled with a housing. In embodiments, the first portion 204-a may be coupled with the second portion 204-b via a strain relief portion 204-c to absorb movement. The flexible heat conductor 204 may operate such that it absorbs thermal energy generated by the device coupled at the first portion 204-a and dissipates the thermal energy into the housing at the second portion 204-b. In embodiments, the flexible heat conduct 204 may include one or more apertures 204-d for cables, connectors, wires and fasteners to pass through, for example.

Figure 2B:
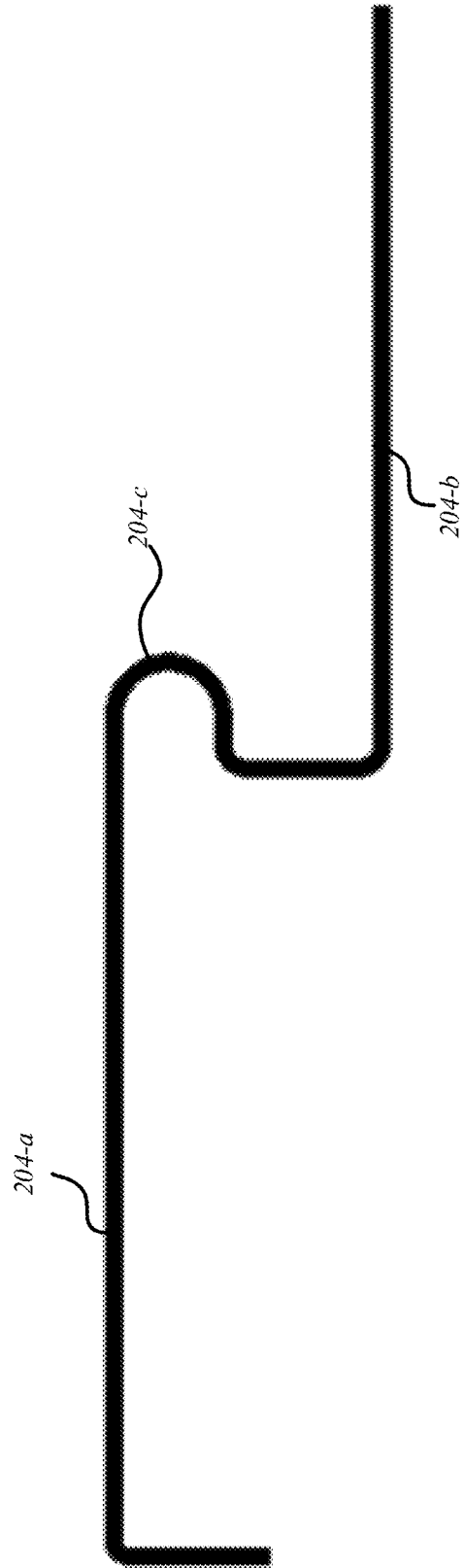
FIG. 2B illustrates an example embodiment of a side view of a flexible heat conductor.

In FIGS. 2A and 2B the first portion 204-a and the second portion 204-b may have substantially the same dimensions. For example, the first portion 204-a and the second portion 204-b may have the same width which may be on the order of magnitude of tens of millimeters (mm), e.g. ~95 mm. Similarly, the first portion 204-a and the second 204-b may also have substantially the same length on the order of tens of mm, e.g. ~10 mm. In other words, each of the first portion 204-a and the second portion 204-b may each be ~10 mm long and ~95 mm wide, for example. Furthermore, the thickness of the flexible heat conductor 204 may be substantially the same throughout and on the order of tenths of mm, e.g., ~0.2 mm. In various embodiments, the dimensions of the flexible heat conductor 204 may be dependent on a number of factors, including the size of the coupled device, the amount of thermal energy required for dissipation, the rate required to dissipate the thermal energy, the materials used for the flexible heat conductor and the housing, and so forth. In addition, the thickness of flexible heat conductor 204 may be based on the above mentioned factors and also the ability to remain flexible such that it can absorb movement.

In the configuration illustrated in FIGS. 2A and 2B, the flexible heat conductor 204 may have a relief strain portion 204-c having a single loop. As similarly discussed above with respect to FIG. 1, the flexible heat conductor 204 may include the relief strain portion 204-c to thermally and physically couple the first portion 204-a and the second portion 204-b and to absorb movement of the second portion 204-b such that it is not transferred to the first portion 204-a to cause deflection or other movement. Moreover, the relief strain portion 204-c may absorb movement of the second portion 204-b relative to the first portion 204-a in any number of directions, such as relative lateral movement, relative separation movement, and relative compression movement. A relative lateral movement may be a movement of the second portion 204-b laterally to the first portion 204-a, a relative separation movement may be a movement of the second portion 204-b away from the first portion 204-a, and a relative compression movement may be a movement of the second portion 204-b towards the first portion 204-a. Various embodiments are not limited in this manner and other directions may be contemplated, such as a combination of movements.

The dimensions of the relief strain portion 204-c can also be dependent on a number of factors including the size of the coupled device, the amount of thermal energy required for dissipation, the rate required to dissipate the thermal energy, the materials used for the flexible heat conductor and the housing, and the amount of movement expected. For example, and in some embodiments, the first loop may have an outside radius measurement on the order of tenths of mm, e.g. ~0.8 mm, and inner radius measurement on the order of tenths of mm, e.g. ~0.6 mm. Various embodiments, are not limited in this manner and other dimensions may also be contemplated. The relief strain portion 204-c may also have a height on the magnitude of mm, e.g. ~4 mm, such that it may couple the first portion 204-a to the second portion 204-b at a relatively "higher" position. For example, the first portion 204-a may need to be at a "higher" position than the second portion 204-b to compensate for the thickness of the device. Therefore, the height of the relief strain portion 204-c may be directly related or corresponding to the height or thickness of the device.

As mentioned, the flexible heat conductor 204 may also include one or more apertures 204-d to provide throughways for cables, wires, connectors, and fasteners, for example. The apertures 204-d may have various dimensions to accommodate these different items. For example, one of the aperture 204-d may have a width and length on the order of magnitude of mms, e.g. ~8 mm wide and ~8.5 mm long to accommodate a connector or connection to pass through to a device. The flexible heat conductor may have a second or different aperture 204-d having a width and length on the order of magnitude of mms, e.g. ~13.7 mm wide and ~4 mm long to accommodate a fastener to secure a device. Various embodiments are not limited in this manner and in some embodiments the flexible heat conductor 204 may have any number of apertures with various dimensions.

FIGS. 3A/3B illustrate an example embodiment of a flexible heat conductor 304. The flexible heat conductor 304 may be similar to the flexible heat conductor 104 and 204 discussed above with respect FIGS. 1, 2A and 2B. For example, flexible heat conductor 304 may include a first portion 304-a that is capable of being coupled with a device and a second portion 304-b that is capable of being coupled with a housing. In embodiments, the first portion 304-a may be coupled with the second portion 304-b via a strain relief portion 304-c to absorb movement. The flexible heat conductor 304 may operate such that it absorbs thermal energy generated by the device coupled at the first portion 304-a and dissipates the thermal energy into the housing at the second portion 304-b. In embodiments, the flexible heat conduct 304 may include one or more apertures 304-d for cables, connectors, wires and fasteners to pass through, for example.

Figure 3B:
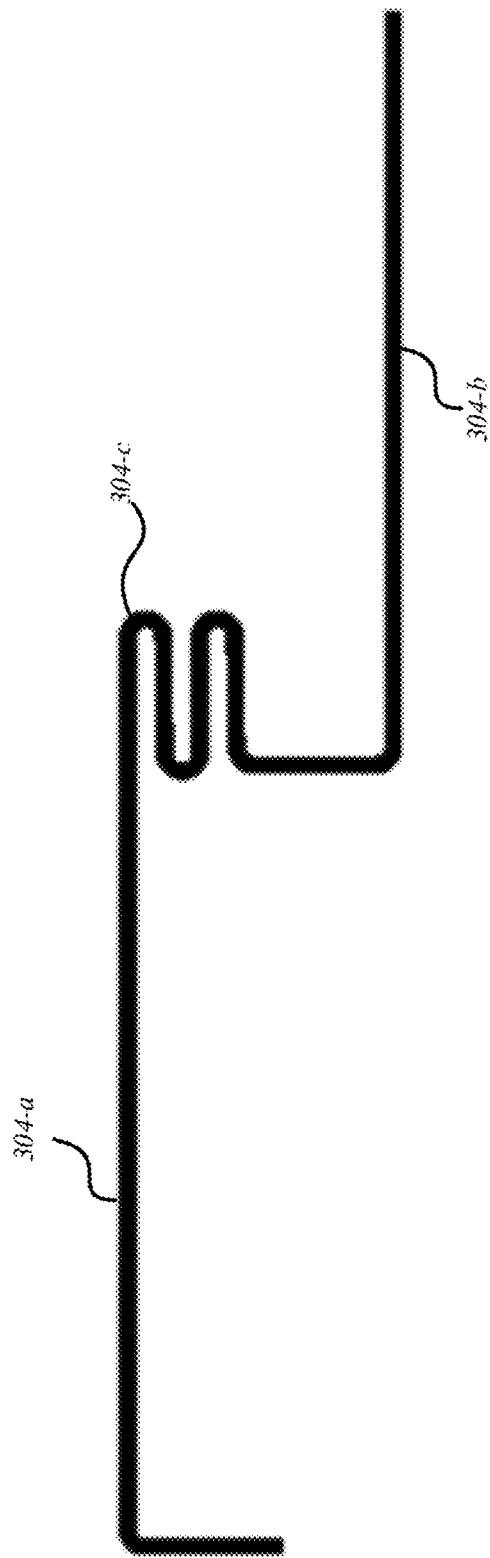
FIG. 3B illustrates a second example embodiment of a side view of a flexible heat conductor.

In FIGS. 3A and 3B the first portion 304-a and the second portion 304-b may have substantially the same dimensions as similarly discussed above with respect to FIGS. 2A and 2B. For example, the first portion 304-a and the second portion 304-b may have the same width which may be on the order of magnitude of tens of millimeters (mm), e.g. ~95 mm. Similarly, the first portion 304-a and the second 304-b may also have substantially the same length on the order of tens of mm, e.g. ~10 mm. The thickness of the flexible heat conductor 304 may be substantially the same throughout and on the order of tenths of mm, e.g., ~0.2 mm. In various embodiments, the dimensions of the flexible heat conductor 304 may be dependent on a number of factors, including the size of the coupled device, the amount of thermal energy required for dissipation, the rate required to dissipate the thermal energy, the materials used for the flexible heat conductor and the housing. In addition, the thickness of flexible heat conductor 304 may be based on the above mentioned factors and also the ability to remain flexible such that it can absorb movement.

In the configuration illustrated in FIGS. 3A and 3B, the flexible heat conductor 204 may have a relief strain portion 304-c having three loops to absorb movement of the second portion 304-b such that it is not transferred to the first portion 304-a. Moreover, the relief strain portion 304-c may absorb movement of the second portion 304-b relative to the first portion 304-a in any number of directions, such as relative lateral movement, a relative separation movement, and a relative compression movement, or combination thereof, as described above. Various embodiments are not limited in this manner and other directions may be contemplated.

The dimensions of the relief strain portion 304-c can also be dependent on a number of factors including the size of the coupled device, the amount of thermal energy required for dissipation, the rate required to dissipate the thermal energy, the materials used for the flexible heat conductor and the housing, and the amount of movement expected. For example and in some embodiments, each of the three loops may have an outside radius measurement on the order of tenths of mm, e.g. ~0.33 mm, and inner radius measurement on the order of tenths of mm, e.g. ~0.13 mm. Various embodiments, are not limited in this manner and other dimensions may also be contemplated. For example, each of the three loops may have different outer and inner radius dimensions. The relief strain portion 304-c may also have a height on the magnitude of mm, e.g. ~4 mm, such that it may couple the first portion 304-a to the second portion 304-b at a relatively "higher" position to accommodate for the height or thickness of the device.

The flexible heat conductor 304 may also include one or more apertures 304-d to provide throughways for cables, wires, connectors, and fasteners, for example. The apertures 304-d may have various dimensions to accommodate these different items and may be similar to the examples discussed above with respect to apertures 204-d in FIGS. 2A and 2B.

Figure 4:
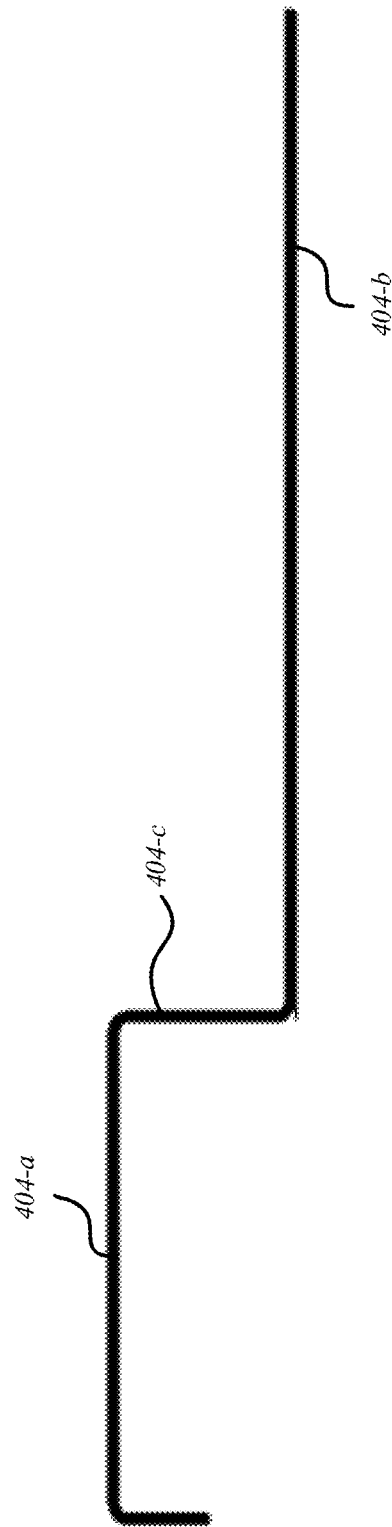
FIG. 4 illustrates a third example embodiment of a side view of a flexible heat conductor.

FIG. 4 illustrates another example embodiment of a flexible heat conductor 404. The flexible heat conductor 404 may be similar to the flexible heat conductors 104, 204 and 304 discussed above with respect FIGS. 1, 2A, 2B, 3A and 3B. For example, flexible heat conductor 404 may include a first portion 404-a that is capable of being coupled with a device and a second portion 404-b that is capable of being coupled with a housing. In embodiments, the first portion 404-a may be coupled with the second portion 404-b via a strain relief portion 404-c to absorb movement. The flexible heat conductor 404 may operate such that it absorbs thermal energy generated by the device coupled at the first portion 404-a and dissipates the thermal energy into the housing at the second portion 404-b. In embodiments, the flexible heat conduct 404 may include one or more apertures (not shown) for cables, connectors, wires and fasteners to pass through, for example.

The flexible heat conductor 404 may include the first portion 404-a and the second portion 404-b which may have substantially the same width as similarly discussed above with respect to FIGS. 2A, 2B, 3A and 3B. For example, the first portion 404-a and the second portion 404-b may have the same width which may be on the order of magnitude of tens of millimeters (mm), e.g. ~95 mm. However, in this example embodiment, the first portion 404-a and the second 404-b may have different lengths. For example and in some embodiments, the second portion 404-b may be approximately twice as long as the first portion 404-a. For example, the second portion 404-b may have a length of ~20 mm and the first portion 404-b may have a length of ~10 mm. The length of the second portion 404-b may be longer such that the second portion 404-b dissipates thermal energy faster rate than a rate at which the first portion 404-a absorbs the thermal energy.

The thickness of the flexible heat conductor 404 may be substantially the same throughout and on the order of tenths of mm, e.g., ~0.2 mm. In various embodiments, the dimensions of the flexible heat conductor 404 may be dependent on a number of factors, including the size of the coupled device, the amount of thermal energy required for dissipation, the rate required to dissipate the thermal energy, the materials used for the flexible heat conductor and the housing. In addition, the thickness of flexible heat conductor 404 may be based on the above mentioned factors and also the ability to remain flexible such that it can absorb movement.

In the configuration illustrated in FIG. 4, the flexible heat conductor 404 may have a relief strain portion 404-c without any loops. However, the flexible heat conductor 404 may still absorb movement of the second portion 404-b such that it is not transferred to the first portion 404-a. For example, the flexibility of the flexible heat conductor 404 may allow the second portion 404-b to move without substantially moving the first portion 404-a based on the flexibility of the flexible heat conductor 404 and the bends of relief strain portion 404-d of the flexible heat conductor 404. More specifically, the bends where the relief strain portion 404-d join the first portion 404-a and the second portion 404-b allow for the second portion 404-b to move without substantially moving the first portion 404-a.

The dimensions of the relief strain portion 404-c can also be dependent on a number of factors including the size of the coupled device, the amount of thermal energy required for dissipation, the rate required to dissipate the thermal energy, the materials used for the flexible heat conductor and the housing, and the amount of movement expected. For example, the relief strain portion 404-c may also have a height on the magnitude of mm, e.g. ~4 mm, such that it may couple the first portion 404-a to the second portion 404-b at a relatively "higher" position to accommodate for the height or thickness of the device. Various embodiments are not limited in this manner.

Figure 5:
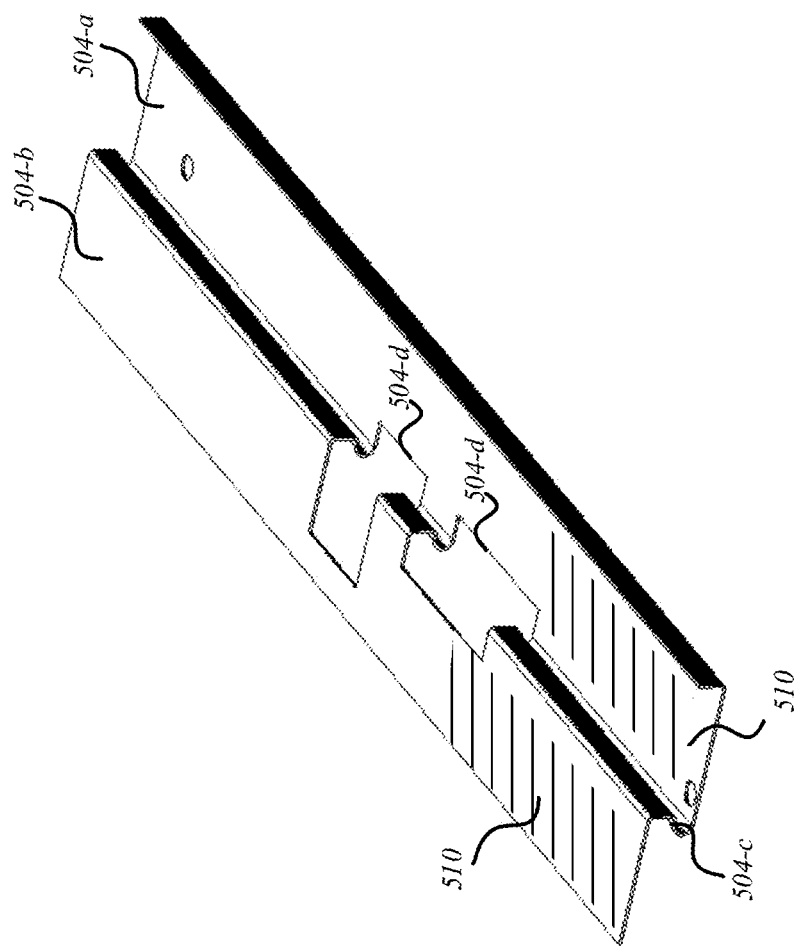
FIG. 5 illustrates an example embodiment a bottom view of a flexible heat conductor with adhesive.

FIG. 5 illustrates an example embodiment of a flexible heat conductor 504 with a fastening material. The flexible heat conductor 504 may be a bottom view of the flexible heat conductor 104 and 204 illustrated in FIGS. 1, 2A and 2B. For example, the flexible heat conductor 504 may include a first portion 504-a that is capable of being coupled with a device and a second portion 504-b that is capable of being coupled with a housing. In embodiments, the first portion 504-a may be coupled with the second portion 504-b via a strain relief portion 504-c to absorb movement. The flexible heat conductor 504 may operate such that it absorbs thermal energy generated by the device coupled at the first portion 504-a and dissipates the thermal energy into the housing at the second portion 504-b. In embodiments, the flexible heat conduct 504 may include one or more apertures 504-d for cables, connectors, wires and fasteners to pass through, for example.

FIG. 5 illustrates the flexible heat conductor 504 with adhesive or a fastening material 510 applied to the bottom. The fastening material 510 may be used to secure the flexible heat conductor 504 to one or more of a device and housing. For example, the fastening material 510 may be applied to the first portion 504-a to secure to a device and to the second portion 504-b to secure to a housing. In embodiments the fastening material 510 may include any type of material capable of securing the flexible heat conductor 504 to one or more surfaces of other objects or devices. For example, the fastening material 510 may include a thermal adhesive, a thermal conductive tape, an epoxy, a securing fastener, or any other type of adhesive. In some embodiments, the fastening material 510 may be chosen based on it thermal conductivity properties. However, various embodiments are not limited in this manner.

The fastening material 510 may be applied to the flexible heat conductor 504 entirely, in sections, at particular portions, only on the first portion 504-a, only on the second 504-b, or any combination thereof. In addition to the fastening material 510, a thermal interface material (not shown) may also be applied to the flexible heat conductor 504 and/or a surface of a housing, device, object, and so forth. The thermal interface material may be applied to increase thermal conductivity between the flexible heat conductor 504 and one or more surfaces. The thermal interface material can include thermal grease, epoxy, phase change materials, polyimide, graphite tape, aluminum tape silicone-coated fabrics, and so forth. Various embodiments are not limited in this manner.

FIG. 6 illustrates an example embodiment of a device 600 for processing information. In some embodiments, device 600 may be a camera device and may include one or more cameras 620. FIG. 6 illustrates device 600 having two cameras 620-a and 620-b, for example. Device 600 may also include one or more connector terminals 622 which may receive a connector through an aperture, as previously discussed. In addition, device 600 may include processing circuitry 624 to process information.

In embodiments, device 600 may be a 3-D camera device capable of detecting and processing information in three-dimensions. For example, device 600 may be a 3-D camera device including Intel's® Realsense® technology. However various embodiments are not limited in this manner and device 600 may be any type of device capable of processing information and generating thermal energy, for example.

Moreover, device 600 as a 3-D camera device including the two or more cameras 620, such as infrared cameras, may be separated on a module to provide 3-D camera capabilities. Thus, as previously discussed, a substantial movement of the device 600 causing a relative displacement between the two cameras of greater than ten micrometers may introduce errors into depth calculations which are critical to depth perception accuracy of the 3-D camera. Therefore, device 600 may be coupled with one of the previously discussed flexible thermal conductors to absorb thermal energy while preventing movement of the camera device. Various embodiments are not limited in this manner.

FIG. 7 illustrates an embodiment of a first logic flow diagram 700. The logic flow 700 may be representative of some or all of the operations executed by one or more embodiments described herein. For example, the logic flow 700 may illustrate operations performed by one or more of the apparatuses discussed with respect to FIGS. 1-6. Various embodiments are not limited in this manner.

In various embodiments, logic flow 700 may include thermally coupling a device comprising one or more cameras and circuitry with a housing to house the device at block 705. For example, a flexible heat conductor may be secured to the device and the housing to allow for thermal energy to transfer between the device and the housing. The flexible heat conductor may be coupled or secured in any number of different ways using one or more of a thermal adhesive, a thermal conductive tape, an epoxy, and a securing fastener. In some embodiments, a thermal interface material may also be used to further thermally couple the device and/or the housing with the flexible heat conductor. More specifically, the thermal interface material may create a better bond between the flexible heat conductor and the device and/or the housing.

Logic flow 700 may also include receiving, by the flexible heat conductor, thermal energy generated by at least one of the one or more cameras and the circuitry at block 710. For example, during operation the one or more cameras and circuitry may create heat or thermal energy which in large quantities may damage components of the device. The heat or thermal energy may be received by the flexible heat conductor via the thermal coupling. More specifically, thermal energy may flow from a surface of the device to the flexible heat conductor. In addition, logic flow 700 at block 715 includes transferring, by the flexible heat conductor, the thermal energy absorbed from a surface of the device to a surface of the housing. For example, thermal energy may be absorbed or passed to a surface of the housing coupled with the flexible heat conductor. In some embodiments, the thermal energy may be dissipated to air via one or more fins. Various embodiments are not limited in this manner.

At block 720, logic flow 700 may also include absorbing, by the flexible heat conductor, movement of the housing such that the movement of the housing does not cause substantial movement of the device. In embodiments, the flexible heat conductor may include a relief strain portion that is capable of absorbing mechanical energy (or movement) until it can be released to an outside environment other than the coupled device. In some embodiments, the movement may be released into an environment when the housing moves from a first position to a second position and then back to the first position. In other words, the relief strain portion will absorb the mechanical energy when the housing moves to the first position and then release the mechanical energy when the housing returns to an original position. Various embodiments are not limited in this manner.

Figure 8:
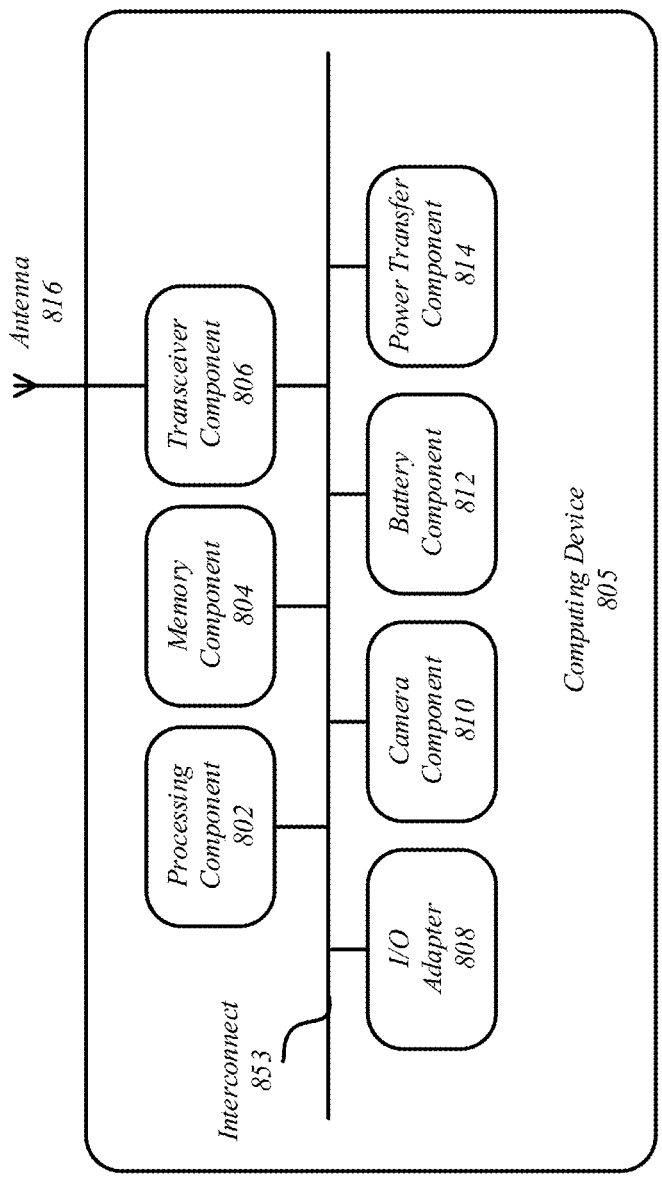
FIG. 8 illustrates an example embodiment of a computing device.

FIG. 8 illustrates an embodiment of a computing device 805. In various embodiments, computing device 805 may be representative of a computing device or system for use with one or more embodiments described herein.

In various embodiments, computing device 805 may be any type of computing device including a computing device including a personal computer (PC), laptop computer, ultra-laptop computer, netbook computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a computing device 805 also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a computing device 805 may be implemented as a smart phone capable of executing computer applications, as well as voice communications and/or data communications. Although some embodiments may be described with a computing device 805 implemented as a smart phone by way of example, it may be appreciated that other embodiments may be implemented using other wireless mobile computing devices as well. The embodiments are not limited in this context. In some embodiments, computing device 805 may also be a navigation system, infotainment system, embedded in home appliances, etc.

As shown in FIG. 8, computing device 805 may include multiple elements. One or more elements may be implemented using one or more circuits, components, registers, processors, software subroutine modules, or any combination thereof, as desired for a given set of design or performance constraints. Although FIG. 8 shows a limited number of elements in a certain topology by way of example, it can be appreciated that more or less elements in any suitable topology may be used in computing device 805 as desired for a given implementation. The embodiments are not limited in this context.

In various embodiments, computing device 805 may include one or more processing unit(s) 802. Processing unit(s) 802 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit or processing circuitry. The processing unit(s) 802 may be connected to and communicate with the other elements and components of the computing system via an interconnect 543, such as one or more buses, control lines, and data lines.

In one embodiment, computing device 805 may include memory 804 to couple to processing unit(s) 802. In various embodiments, the memory 804 may store data and information for use by the computing device 805.

Memory 804 may be coupled to processing unit(s) 802 via interconnect 853, or by a dedicated communications bus between processing unit(s) 802 and memory 804, as desired for a given implementation. Memory 804 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 804 can store instructions and data momentarily, temporarily, or permanently. The memory 804 may also store temporary variables or other intermediate information while the processing unit(s) 802 is executing instructions. The memory 804 is not limited to storing the above discussed data and may store any type of data.

The computing device 805 may include a transceiver 806 which includes one or more components and circuitry to transmit and receive information using radio-frequency signals. More specifically, the transceiver 806 may include circuitry to produce radio-frequency mobile radio signals which are to be sent and for processing radio-frequency mobile radio signals which have been received. To this end, the transceiver 806 may be coupled to one or more antenna 816. The transmitted or received mobile radio signals are in one or more particular frequency ranges, which are typically prescribed by the mobile radio standard(s) supported by the radio-frequency assemblies. For example, transceiver 806 may include circuitry to process information according to one or more IEEE standards, one or more peer-to-peer protocols, and so forth. Various embodiments are not limited in this manner and transceiver 806 may transmit or receive information via any standard in any frequency range with one more devices, as previously mentioned.

In various embodiments, the transceiver 806 may be used to communicate with one or more other devices or stations. The transceiver 806 may send and receive information from the stations as one or more pockets, frames, and any other transmission structure in accordance with one or more protocols.

The computing device 805 may include input/output adapter 808. Examples of I/O adapter 808 may include Universal Serial Bus (USB) ports/adapters, IEEE 1394 Firewire ports/adapters, and so forth. The embodiments are not limited in this context.

For example, an I/O adapter 808 may also include an input device or sensor, such as one or more buttons, a keyboard, a keypad, a touchscreen display, a touch sensitive device, a microphone, a biometric finger printer reader, biometric eye scanner or any other device used for inputting information into computing device 805. Moreover, the I/O adapter 808 may be a sensor including any hardware or logic to detect one or more touches or inputs on or near a housing of the apparatus, a display of the apparatus including a touchscreen or touch sensitive display.

In various embodiments, the I/O adapter 808 may include one or more components to output information to a user. For example, the I/O adapter 808 may include a speaker to output an audible noise or a haptic feedback device to output a vibration. The I/O adapter 808 may be located any within or on computing device 805, or may be separate and connected to the computing device 805 via a wired or wireless connection.

The computing device 805 may also include a camera component 810. Camera component 810 may include one or more cameras and includes camera circuitry to capture, receive or detect image information. The camera component 810 may be any type of camera including a still photo camera and/or a video camera capable of capturing the image information. For example, camera component 810 can include an infrared camera, a magnetic resonance camera, a rangefinder camera, a ultrasonography camera, a webcam, a single lens reflex (SLR) camera, a digital SLR camera, a mirrorless camera, and so forth. In some embodiments, the camera component 810 may be a 3-D camera and include Intel's® Realsense® technology. Various embodiments are not limited in this manner.

The computing device 805 may also include storage 812. Storage 812 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 812 may include technology to increase the storage performance enhanced protection for valuable digital media when multiple hard drives are included, for example. Further examples of storage 812 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In some embodiments, the computing device 805 may include a power transfer component 814, such an induction coil which may transfer and receive electrical energy using electromagnetic induction. Various embodiments are not limited in this manner.

Figure 9:
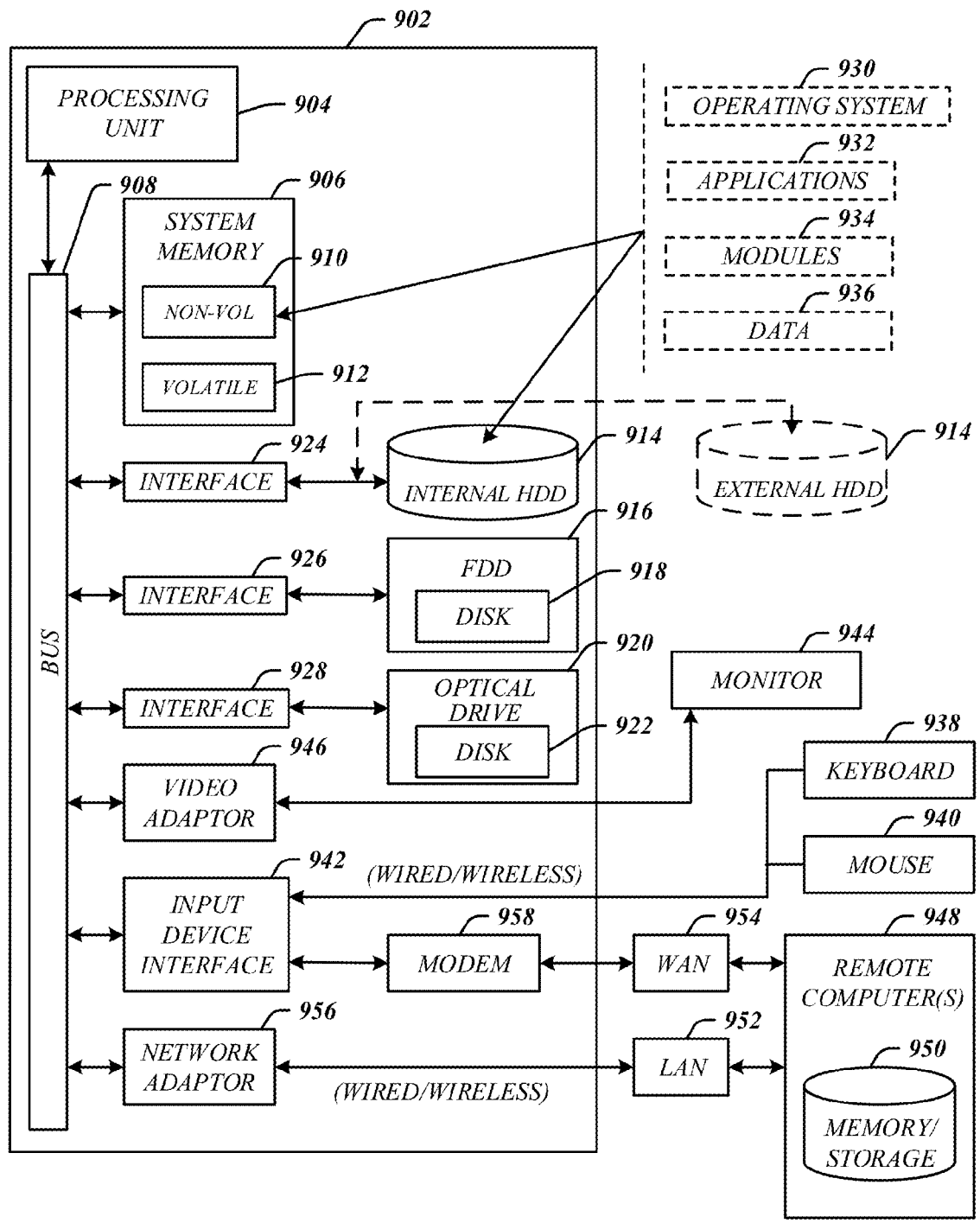
FIG. 9 illustrates an example embodiment of a computing architecture.

FIG. 9 illustrates an embodiment of an exemplary computing architecture 900 suitable for implementing various embodiments as previously described. In one embodiment, the computing architecture 900 may include or be implemented as part of system 105.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 includes a processing unit 904, a system memory 906 and a system bus 908. The processing unit 904 can be any of various commercially available processors.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the computing devices 102 and 104.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 902 family of standards, such as wireless devices operatively disposed in wireless communication (e.g., IEEE 902.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 902.11x (a, b, g, n, etc.) to provide secure, reliable, fast wireless connectivity. A Wi-Fi network can be used to connect computers to each other, to the Internet, and to wire networks (which use IEEE 902.3-related media and functions).

The various elements of the system and devices as previously described with reference to FIGS. 1-9 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-three provided below are intended to be exemplary and non-limiting.

In a first example, a system, an apparatus, or a flexible heat conductor may transfer thermal energy absorbed from a surface of a device to a surface of a housing, the flexible heat conductor comprising a first portion securable to the surface of the device, a second portion securable to the surface of the housing, and a strain relief portion to couple the first portion with the second portion, the strain relief portion to allow movement of the second portion without causing movement of the first portion.

In a second example and in furtherance of the first example, an apparatus may include the strain relief portion comprising a first relief loop to absorb movement of the second portion in at least one direction relative to the first portion.

In a third example and in furtherance of any of the previous examples, an apparatus may include the strain relief portion comprising a second relief loop and a third relief loop, the second relief loop to couple the first relief loop with the third relief loop, and at least one of the first, second and third relief loops to absorb movement of the second portion in at least one direction relative to the first portion.

In a fourth example and in furtherance of any of the previous examples, an apparatus may include the flexible heat conductor comprising one or more apertures to provide a throughway for one or more connectors for the device, the one or more apertures at least partially in the first portion, the second portion and the relief portion of the flexible heat conductor.

In a fifth example and in furtherance of any of the previous examples, an apparatus may include the first portion comprising a width and a length substantially the same as a width and a length of the device, the first portion to physically contact the surface of the device to absorb the thermal energy.

In a sixth example and in furtherance of any of the previous examples, an apparatus may include the first portion and second portion having a substantially same width and a substantially same length.

In a seventh example and in furtherance of any of the previous examples, an apparatus may include the first portion and second portion having a substantially same width and the second portion comprising a length at least twice as long as a length of the first portion.

In an eighth example and in furtherance of any of the previous examples, an apparatus may include the first portion secured to the device and the second portion secured to the housing using one or more of a thermal adhesive, a thermal conductive tape, an epoxy, and a securing fastener.

In a ninth example and in furtherance of any of the previous examples, an apparatus may include at least one of copper, aluminum, diamond, a copper-tungsten material, a silicon carbide material, and a beryllium oxide material.

In a tenth example and in furtherance of any of the previous examples, a system, may include a device comprising one or more cameras and circuitry to process information detected by the one or more cameras, a housing to house the device, and a flexible heat conductor to transfer thermal energy absorbed from a surface of the device to a surface of the housing. The flexible heat conductor comprising a first portion securable to the surface of the device, a second portion securable to the surface of the housing, and a strain relief portion to couple the first portion with the second portion, the strain relief portion to allow movement of the second portion without causing movement of the first portion.

In an eleventh example and in furtherance of any of the previous examples, a system, may include the strain relief portion comprising a first relief loop to absorb movement of the second portion in at least one direction relative to the first portion.

In a twelfth example and in furtherance of any of the previous examples, a system, may include the strain relief portion comprising a second relief loop and a third relief loop, the second relief loop to couple the first relief loop with the third relief loop, and at least one of the first, second and third relief loops to absorb movement of the second portion in at least one direction relative to the first portion.

In a thirteenth example and in furtherance of any of the previous examples, a system, may include one or more apertures to provide a throughway for one or more connectors for the device, the one or more apertures at least partially in the first portion, the second portion and the relief portion of the flexible heat conductor.

In a fourteenth example and in furtherance of any of the previous examples, a system, may include the first portion comprising a width and a length substantially the same as a width and a length of the device, the first portion to physically contact the surface of the device to absorb the thermal energy.

In a fifteenth example and in furtherance of any of the previous examples, a system, may include the first portion and second portion having a substantially same width and a substantially same length.

In a sixteenth example and in furtherance of any of the previous examples, a system, may include the first portion and second portion having a substantially same width and the second portion comprising a length at least twice as long as a length of the first portion.

In a seventeenth example and in furtherance of any of the previous examples, a system, may include the first portion secured to the device and the second portion secured to the housing using one or more of a thermal adhesive, a thermal conductive tape, an epoxy, and a securing fastener.

In an eighteenth example and in furtherance of any of the previous examples, a system, may include the flexible heat conductor comprising at least one of copper, aluminum, diamond, a copper-tungsten material, a silicon carbide material, and a beryllium oxide material.

In a nineteenth example and in furtherance of any of the previous examples, an apparatus and/or system may perform a method may include thermally coupling, by a flexible heat conductor, a device comprising one or more cameras and circuitry with a housing to house the device, receiving, by the flexible heat conductor, thermal energy generated by at least one of the one or more cameras and the circuitry, transferring, by the flexible heat conductor, the thermal energy absorbed from a surface of the device to a surface of the housing, and absorbing, by the flexible heat conductor, movement of the housing such that the movement of the housing does not cause substantial movement of the device.

In a twentieth example and in furtherance of any of the previous examples, an apparatus and/or system may perform a method including receiving movement by a strain relief portion of the flexible heat conductor, the strain relief portion having a first relief loop and dissipating the movement by the first relief loop.

In a twenty-first example and in furtherance of any of the previous examples, an apparatus and/or system may perform a method including receiving movement by a strain relief portion of the flexible heat conductor, the strain relief portion having three loops and dissipating the movement by the three loops.

In a twenty-second example and in furtherance of any of the previous examples, an apparatus and/or system may perform a method including securing a first portion of the flexible heat conductor to a surface of the device and securing a second portion of the flexible heat conductor to a surface of the housing.

In a twenty-third example and in furtherance of any of the previous examples, an apparatus and/or system may perform a method including using one or more of a thermal adhesive, a thermal conductive tape, an epoxy, and a securing fastener to secure at one least one of the first portion and the second portion of the flexible heat conductor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a flexible heat conductor to transfer thermal energy absorbed from a surface of a device to a surface of a housing, the flexible heat conductor comprising:
   a first portion securable to the surface of the device,
   a second portion securable to the surface of the housing,
   a strain relief portion to couple the first portion with the second portion, the strain relief portion to allow movement of the second portion without causing movement of the first portion, and
   one or more apertures at least partially in the first portion, the second portion and the strain relief portion of the flexible heat conductor.

2. The apparatus of claim 1, the strain relief portion comprising a first relief loop to absorb movement of the second portion in at least one direction relative to the first portion.

3. The apparatus of claim 2, the strain relief portion comprising a second relief loop and a third relief loop, the second relief loop to couple the first relief loop with the third relief loop, and at least one of the first, second and third relief loops to absorb movement of the second portion in at least one direction relative to the first portion.

4. The apparatus of claim 1, the one or more apertures to provide a throughway for one or more connectors for the device.

5. The apparatus of claim 1, the first portion comprising a width and a length substantially the same as a width and a length of the device, the first portion to physically contact the surface of the device to absorb the thermal energy.

6. The apparatus of claim 1, the first portion and second portion having a substantially same width and a substantially same length.

7. The apparatus of claim 1, the first portion and second portion having a substantially same width and the second portion comprising a length at least twice as long as a length of the first portion.

8. The apparatus of claim 1, the first portion secured to the device and the second portion secured to the housing using one or more of a thermal adhesive, a thermal conductive tape, an epoxy, and a securing fastener.

9. The apparatus of claim 1, comprising at least one of copper, aluminum, diamond, a copper-tungsten material, a silicon carbide material, and a beryllium oxide material.

10. The apparatus of claim 1, the device comprising one or more cameras and circuitry with a housing to house the device.

11. A system, comprising:
    a device comprising one or more cameras and circuitry to process information detected by the one or more cameras;
    a housing to house the device; and
    a flexible heat conductor to transfer thermal energy absorbed from a surface of the device to a surface of the housing, the flexible heat conductor comprising:
    a first portion securable to the surface of the device,
    a second portion securable to the surface of the housing,
    a strain relief portion to couple the first portion with the second portion, the strain relief portion to allow movement of the second portion without causing movement of the first portion, and
    one or more apertures at least partially in the first portion, the second portion and the strain relief portion of the flexible heat conductor.

12. The system of claim 11, the strain relief portion comprising a first relief loop to absorb movement of the second portion in at least one direction relative to the first portion.

13. The system of claim 12, the strain relief portion comprising a second relief loop and a third relief loop, the second relief loop to couple the first relief loop with the third relief loop, and at least one of the first, second and third relief loops to absorb movement of the second portion in at least one direction relative to the first portion.

14. The system of claim 11, the one or more apertures to provide a throughway for one or more connectors for the device.

15. The system of claim 11, the first portion comprising a width and a length substantially the same as a width and a length of the device, the first portion to physically contact the surface of the device to absorb the thermal energy.

16. The system of claim 11, the first portion and second portion having a substantially same width and a substantially same length.

17. The system of claim 11, the first portion and second portion having a substantially same width and the second portion comprising a length at least twice as long as a length of the first portion.

18. The system of claim 11, the first portion secured to the device and the second portion secured to the housing using one or more of a thermal adhesive, a thermal conductive tape, an epoxy, and a securing fastener.

19. The system of claim 11, the flexible heat conductor comprising at least one of copper, aluminum, diamond, a copper-tungsten material, a silicon carbide material, and a beryllium oxide material.

20. A flexible heat conductor, comprising:
    a first portion to absorb a first thermal energy;
    a second portion thermally coupled to the first portion to dissipate at least a portion of the first thermal energy;
    a strain relief portion to mechanically couple the first portion with the second portion to allow movement of the first and second portion independently from each other; and
    at least one aperture, the at least one aperture partially formed in the first portion, the second portion and the strain relief portion.

21. The flexible heat conductor of claim 20, the strain relief portion comprising:
    a plurality of relief loops, at least one of the plurality of relief loops to absorb movement of the second portion in at least one direction relative to the first portion.

22. The flexible heat conductor of claim 20, the first portion and second portion having a substantially same width and a substantially same length.

23. The flexible heat conductor of claim 20, the first portion and second portion having a substantially same width and the second portion comprising a length at least twice as long as a length of the first portion.

24. The flexible heat conductor of claim 20, at least the first portion or the second portion comprising at least one of copper, aluminum, diamond, a copper-tungsten material, a silicon carbide material, or a beryllium oxide material.

* * * * *